Figure 1:
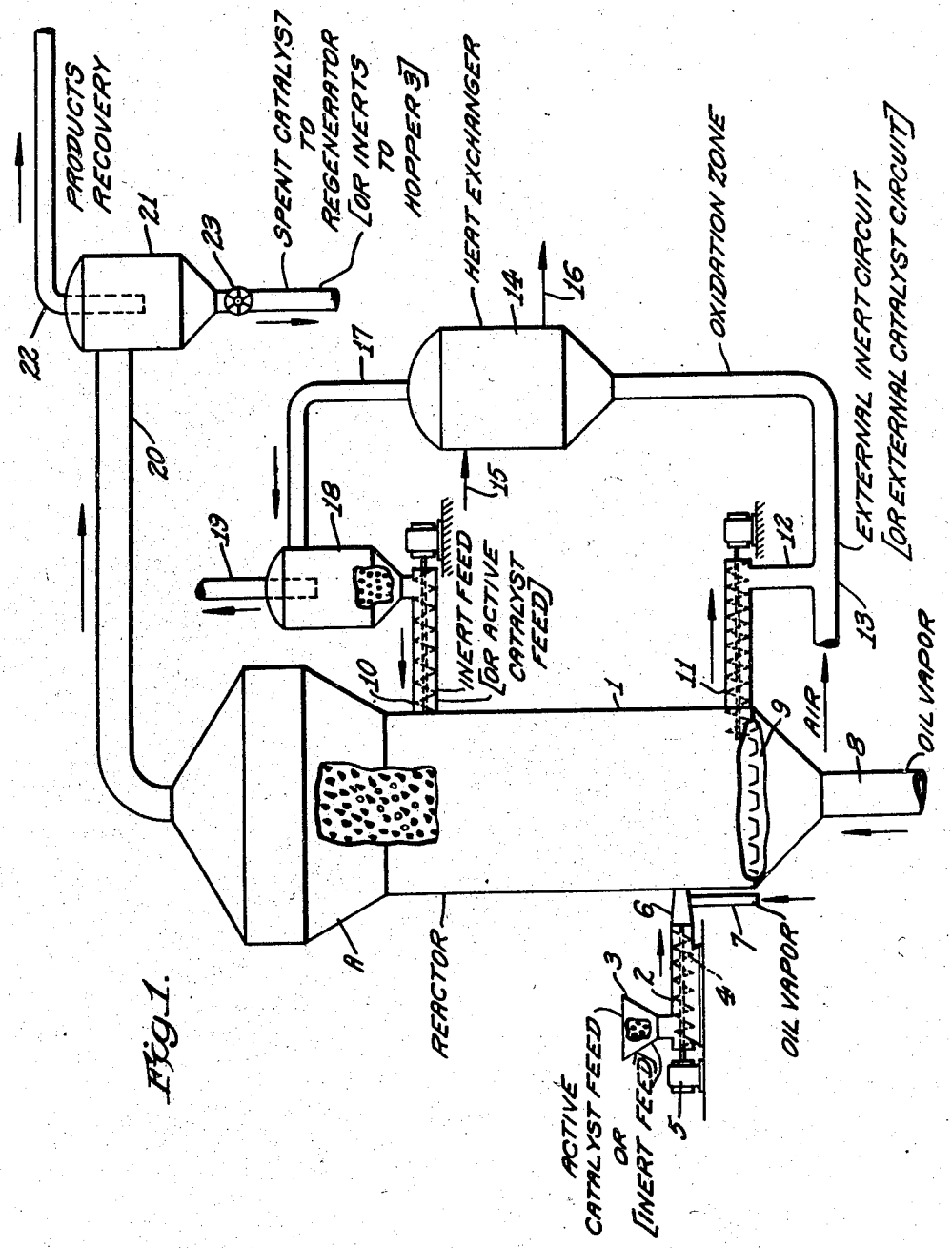

Dec. 14, 1948.   W. H. BORCHERDING   2,455,915
CATALYTIC CONVERSION OF HYDROCARBONS
Filed July 6, 1944   2 Sheets-Sheet 1

INVENTOR.
WALTER H. BORCHERDING
BY
ATTORNEY

INVENTOR.
WALTER H. BORCHERDING
BY
ATTORNEY

Patented Dec. 14, 1948

2,455,915

UNITED STATES PATENT OFFICE 2,455,915

CATALYTIC CONVERSION OF HYDROCARBONS

Walter H. Borcherding, New York, N. Y., assignor to The M. W. Kellogg Company, Jersey City, N. J., a corporation of Delaware Application July 6, 1944, Serial No. 543,676

10 Claims. (Cl. 196—52)

The present invention relates to improvements in catalytic conversion processes wherein the reactants undergoing conversion are contacted in the vapor phase with a finely divided solid catalyst which is dispersed in the reacting vapors flowing upwardly through a conversion zone, and passed through the conversion zone either in the same or opposite to the direction of flow of the vapors. Although not limited thereto, the invention is especially well exemplified by its application to catalyst conversion of hydrocarbons by reactions such as cracking, reforming, dehydrogenation, aromatization, and similar reactions wherein the activity of the catalyst is progressively decreased during the reaction by reason of the deposition of a carbonaceous material thereon.

Heretofore, intermittent processes have been proposed and used for such catalytic conversions. For instance, the conversion of gas oil and similar high boiling hydrocarbons to low boiling fractions such as gasoline has been practiced by a method involving passing the high boiling hydrocarbons in contact with a fixed bed of catalyst until the activity of the catalyst is decreased to a point where regeneration is necessary. The catalyst bed is then regenerated in situ by passing an oxygen-containing gas therethrough, thereby burning off the carbonaceous deposit and revivifying the catalyst. One of the advantages inherent in this type of operation resides in the fact that the weight or concentration of the catalyst in the conversion zone may be regulated entirely independently of the velocity of the vapor through the zone. However, this process has certain disadvantages such as its discontinuous or intermittent character due to the alternating conversion and regeneration periods, and variations in quality and quantity of conversion products at various periods in the conversion stage due to the progressive change in the average activity of the catalyst during the conversion period.

It has further been proposed to eliminate certain of the disadvantages of the intermittent type of processing by dispersing finely divided or powdered catalytic material in the reactant vapors, flowing the mixture thus produced upwardly through the conversion zone, and thereafter separating the used catalyst from the conversion products by any one of various suitable means such as cyclone separators, electrostatic precipitators, and the like. A process of this general character is exemplified by Belchetz U. S. Patent 2,312,230. Processing in this manner has certain inherent advantages such as the intimacy of contact produced between the finely divided catalytic material and vapors, continuity of operation, and substantially constant average activity of the catalyst throughout the conversion period thereby providing substantial uniformity in quality and quantity of conversion products throughout the conversion period. This process, however, lacks one of the important advantages of the fixed bed type, namely, the capability of varying the vapor velocity of the reactants independently of the catalyst concentration in the conversion zone. This dependency results from the fact that the velocity of the catalyst upwardly through the reaction zone is dependent upon the velocity of the gas and the settling rate of the catalyst particles, the latter in turn being dependent upon fixed characteristics such as the specific gravity, shape and size of the catalyst particles.

It has been observed that the concentration of catalyst in the dispersion passing upwardly through the reaction zone is substantially greater than the feed concentration due to the phenomena of "slip" and consequent difference in the vapor velocity and catalyst velocity through the zone. In various reactions, a definite resident time of the vapors in the reaction zone is required and for this reason, among others, a definite vapor velocity within predetermined limits preferably should be maintained. In catalytic cracking for example, in various instances a relatively low vapor velocity, as low as about 1 to 3 ft./second has been found to be advantageous. However, no claim of originality on behalf of applicant is made respecting the maintenance of such low velocity conditions, and the advantages flowing therefrom per se. The utilization of such low vapor velocities results in a catalyst concentration in the conversion zone much greater than the feed concentration, and in various instances such concentrations are in excess of that desirable for optimum conversion. Pursuant to the present invention, such unduly high concentrations of catalyst are lowered to optimum limits by circulating solid inert particles through the conversion zone as hereinafter described, without any change in the vapor velocity.

The extent to which the catalyst concentration in the conversion zone is affected by the introduction of the inert particles is dependent upon the amount introduced and settling rate of the latter particles as illustrated by the following example.

In the catalytic cracking of a light gas oil having an A. P. I. gravity of 35 employing a particular reactor system wherein the dispersion of the catalyst particles in the gas oil vapors was passed concurrently upwardly through the reactor, it was ascertained that optimum results could be produced by maintaining the following conditions:

Operation A

Temperature _____ 950° F.
Vapor Velocity _____ 1 ft./sec.
Catalyst concentration _____ 10 lbs./cu. ft. of reactor space
Weight ratio of catalyst to oil fed _____ 4 to 1

Utilizing the same reactor system and operating conditions as Operation A in the cracking of a heavier gas oil having an A. P. I. gravity of 25, a lower concentration of catalyst, for example of about 50% of the above and maintenance of the other operating conditions including the vapor velocity at the same values, was indicated and ascertained to produce a more favorable conversion. Under such conditions in accordance with the present invention a sufficient quantity of inert particles is introduced to decrease the weight or concentration of catalyst in the conversion zone to one-half the amount present in Operation A. For example, when inert particles having substantially the same settling rate as the catalyst particles are employed, such particles would be introduced into the conversion zone to the extent of 50% of the total solids introduced, the reaction system and other operating conditions utilized being the same as in Operation A. The application of the invention is particularly advantageous under conditions wherein relatively low vapor velocities through the conversion zone are employed, particularly of the order of about 1 to 3 ft./second.

A further aspect and advantage of the process is the utilization of the circulated inert material to provide temperature control of the conversion zone. Various other aspects, features and advantages of the invention will be apparent from the following detailed description of several embodiments of the invention.

In Figure 1, reference numeral 1 indicates a reactor or conversion chamber through which a dispersion of solid particles of catalytic material in reactant vapors is passed upwardly, and which is of suitable dimensions to provide a conversion zone of sufficient size to permit the required completeness of reaction. Means are provided in the lower part of the chamber for supplying the dispersion of catalytic particles in the reactant vapors. The latter means may suitably comprise a screw conveyor or "solids-pump" 2 to which active finely divided or powdered catalyst, either fresh or regenerated is supplied from a hopper 3, or other source. Catalyst thus introduced into conveyor 2 is fed into chamber 1 by rotation of the screw 4 by a suitable prime mover such as a motor 5. Conveyor 2 preferably is a solids-pump of the type described in Kinyon U. S. Patent 1,555,539. The reactant vapors such as gas oil vapors, or a portion thereof, may be supplied into the end portion 6 of conveyor 2 adjacent to chamber 1 through line 7. The end portion 6 of the conveyor constitutes a mixing chamber wherein a fluidized mass of the catalyst and vapor may be produced. Alternatively, a portion or all of the reactant vapor may be introduced at the bottom of chamber 1 through a vapor distributing plate 9. In the catalytic cracking of high boiling hydrocarbons to low boiling fractions such as naphtha or gasoline, the reactant vapors may consist of gas oil vapors at a suitable conversion temperature, for example about 825° to 925° F. and the catalyst may consist of finely divided particles of any suitable cracking catalyst such as an activated clay of the type known as "Super-Filtrol." During the passage of the dispersion of catalyst and reactant vapors upwardly through the chamber, the conversion to low boiling hydrocarbons proceeds resulting in the formation of a deactivating deposit of carbonaceous material on the catalyst. The deposit thus formed makes it essential that fresh catalyst be continually added and spent catalyst continually withdrawn from the conversion zone. The optimum feed concentration, that is the quantity of catalyst present in a unit volume of the vapors charged, is largely dependent upon the extent to which deactivating deposits are produced and their effect on the catalyst. In catalytic cracking this value is usually given as the weight ratio on a liquid basis for the oil charge and this feed ratio, as in the above example, may be four parts of catalyst to one part of oil, or a much higher ratio as described in in said Belchetz patent.

In the embodiment of the process illustrated by Figure 1, catalytically inert particles are provided having settling rates such as to permit them to flow downwardly through the reaction zone in a direction opposite or countercurrent to the flow of the dispersion of catalytic material. These settling rates are dependent upon the size, shape and density of the dispersed particles. The inert particles employed, in the embodiment shown in Figure 1, are preferably such that their settling rate is sufficiently low to permit them to settle slowly through the dispersion of solid particles in the conversion zone and also sufficiently high to prevent them from being carried upwardly out of the conversion zone. An enlarged section A is preferably provided in the upper part of the conversion zone to facilitate the prevention of inert particles being carried out overhead by reason of the decreased vapor velocity in this enlarged section.

The inert particles are continually introduced at the upper portion of the conversion zone by suitable feeding means such as a screw conveyor 10, and withdrawn from the bottom portion of the zone by a similar conveyor means 11. In the flow illustrated in Figure 1, the inert particles are shown in open outline and the catalyst particles as solid. The inert particles thus withdrawn may suitably be heated, or cooled, dependent upon the heat requirements of the conversion involved before reintroduction to the conversion zone. Suitably, the withdrawn inert particles may be treated with an inert gas such as steam to recover any adsorbed oil vapor, and/or heated in the presence of an oxidizing gas to remove any carbonaceous deposits thereon. As shown, the inert particles discharged from conveyor 11 through pipe 12 may be suspended in a stream of air in pipe 13 and the suspension carried through a heat exchanger 14.

Heat exchanger 14 may be of the conventional tubular type to which a heat exchange medium is supplied by line 15 and withdrawn by line 16. Any carbonaceous deposits present on the inert particles may be burned off during the passage of the dispersion through line 13. The mixture of inert particles and gaseous carrier is withdrawn from exchanger 14 after the desired adjustment of its temperature therein through line 17 and passed to a suitable gas-solid separator such as a cyclone separator 18, gas being withdrawn overhead through line 19 and the inert particles from the bottom of the cyclone to conveyor 10, thus completing the cyclic movement of the inert particles.

The dispersion of used or spent catalyst and vaporous conversion products is withdrawn from the enlarged section A through transfer line 20 and passed to a suitable gas-solids separating system such as a cyclone separator or separators 21 wherein the vaporous conversion products are separated overhead through line 22 and passed to a suitable products recovery system such as fractionators, and the like, and the spent catalyst separated at the bottom and withdrawn through a rotary valve 23 and sent to a suitable regenerating system, not illustrated.

A wide variety of materials obviously may be utilized to subserve the function of the catalytically inert solid particles. For example, in the case of catalytic cracking processing catalytically inactive or substantially inactive natural clays in contra-distinction to activated clays may be employed. Likewise, catalytic material, the activity of which has been entirely or largely permanently destroyed by sintering or the like, may be employed. In the case of the modification described above, I regard evenly sized spherical pellets such as may be readily produced from slag, and metals as especially advantageous since they may be provided with substantially uniform settling rates with minimized tendency towards segregation during their circulation in the process.

The principle of the invention may further be embodied in a modified process wherein the settling rate of the catalytic particles is such that they flow countercurrently to the reactant vapors and hence are introduced at the upper portion of the conversion zone, for example through feeding means 10 and are withdrawn at the lower portion thereof, for example through conveyor 11. In this instance, through feeding means 2, inert particles are introduced having a settling rate such that they are carried through the conversion zone concurrently with the reactant vapors and separated therefrom in separator 21.

This reverse flow is indicated on Figure 1 by reverse legends from the flow previously described, and distinguished therefrom by insertion in brackets. The presence of the inert particles in the conversion zone serves to decrease the rate of fall of the heavier catalyst particles thereby increasing the amount thereof in the conversion zone.

Figure 2:
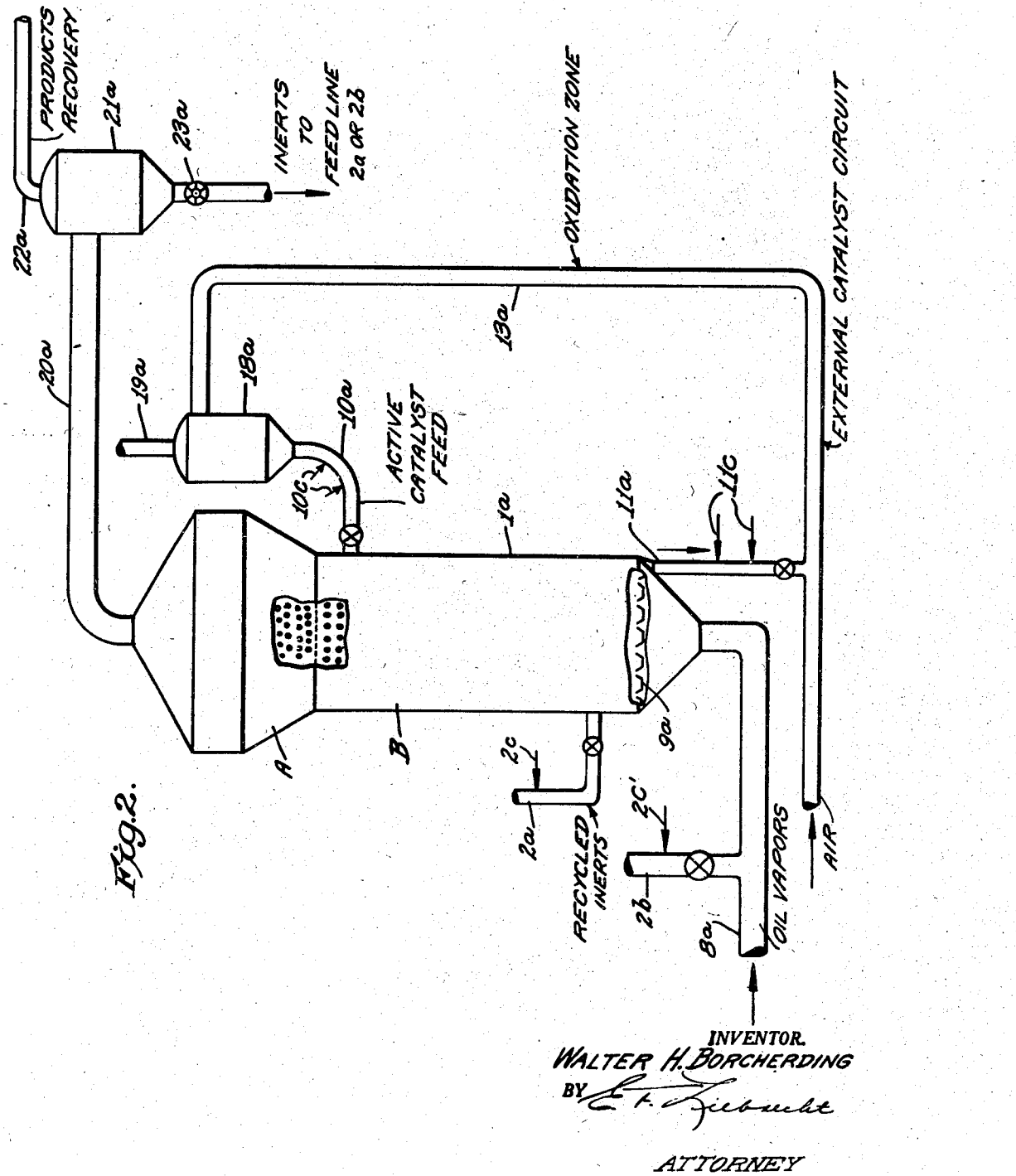

Figure 2 illustrates a modified system in which structural elements corresponding to those in Figure 1 are indicated by corresponding reference numerals with the subscript $a$. The flow illustrated in this embodiment is similar to the alternative flow illustrated by the bracketed legends in Figure 1 wherein relatively heavy catalyst particles are introduced at the upper portion of the conversion zone and the relatively light inert particles are withdrawn overhead with the vaporous product, recovered in the cyclone separator, and returned to the lower part of the reactor through element 3. The modification shown in Figure 2 differs from that described in Figure 1 in that standpipes 2a or 2b, 10a and 11a are substituted for the "solids-pumps" 2, 10 and 11. Each of the standpipes is suitably provided with vertically spaced aerating means 2c, 2c', 10c and 11c to maintain the solid particles therein in a fluidized condition whereby they are utilized to build up a hydrostatic pressure similar to a column of liquid, as described in Jewell Patent No. 2,304,827.

The following is an example of suitable conditions for the practice of the process in a catalytic cracking operation pursuant to the flow illustrated by Figure 2. In this example, the cracking catalyst component consisted of relatively coarse particles varying essentially between 60 and 140 mesh of a synthetically produced compound composed of alumina and silica, and the inert component of relatively fine particles most of which were finer than 140 mesh of inert crystalline silica, the mesh analysis of these components being as follows:

|  | Cracking Catalyst | Inert |
|---|---|---|
| +40 mesh | Trace | Trace |
| −40+60 | .5 | 1 |
| −60+80 | 25 | 3 |
| −80+100 | 22 | 1 |
| −100+120 | 32 | 4 |
| −120+140 | 10 | 4 |
| −140+200 | 6 | 13 |
| −200 | Trace | 74 |

Vapors of a suitable cracking stock such as a gas oil, preheated to a temperature suitable for the cracking reaction is supplied to line 8a at a regulated rate so that the average velocity thereof upwardly through the conversion zone is about 1 foot per second. Equal quantities of the fine inert crystalline silica component and relatively coarse catalyst component are introduced to the system initially until the desired optimum amount or concentration of catalyst particles is present and maintained in the lower part B of reactor 1a. Under these conditions the enlarged disengaging zone A may be maintained relatively free of the relatively coarse catalyst particles; for example under the specified conditions the catalyst particles present therein may comprise only 1% of the total solids passing through line 20a, although the quantity of inert-to-catalytic solids in zone B will be approximately equal and the density of the dense catalyst-inert phase therein maintained at a value of about 20-35 lbs./cu. ft. Inert particles separated at 23a are continually returned to the system through standpipes lines 2b or 2a. Catalyst particles are withdrawn from the lower part of zone B through standpipe 11a and conveyed with air through the oxidation or regeneration zone 13a, recovered in cyclone 18a, and the active regenerated catalyst continually returned to the reactor through standpipe 10a. The presence of inert particles together with catalyst particles in solids withdrawn through line 11a is advantageous rather than otherwise, and it is contemplated that operating under the described conditions, a certain amount of the inert component may likewise circulate through line 13a due both to the presence of relatively coarse inert particles as well as relatively coarse catalytic particles in the feed solids, and to imperfect classification between fine and coarse particles at the lower part of reactor 1a.

Pursuant to a further embodiment of my invention the operating conditions including the low upward vapor velocity through the conversion zone may be the same except that the catalytically inert particles introduced may have a settling rate such that they are carried out of the conversion system concurrently with the catalytic particles and are separated therewith in separator 21. In this modification the inert particles may suitably be introduced in the required proportion in hopper 3 in admixture with the active catalyst material, and the composite material withdrawn from separator 21 through valve 23 and sent through the regeneration operation, and then recycled to hopper 3 without any intermediate separation. In this embodiment, feeding means 10 and 11 are of course not employed. The resulting presence of the inert material in the regeneration operation is advantageous to the extend that its heat absorption capacity enables it to absorb excess heat developed during regeneration. In this modified embodiment the settling rate of the inert particles may be advantageously substantially the same as the catalytic particles thereby permitting the homogeneous separation of the composite in the separating system 21.

The present application is a continuation-in-part of my co-pending application Ser. No. 372,613, filed December 31, 1940, now abandoned.

I claim:

1. A process of catalytically converting hydrocarbons wherein hydrocarbon vapors are contacted with finely divided dispersed catalyst to effect the desired conversion and also resulting in the formation of deactivating deposits of carbonaceous material on the catalyst which comprises flowing vapors of the hydrocarbons upwardly through a conversion zone at a relatively low vapor velocity of about 1 to 3 feet per second adapted to provide the required vapor resident time in said zone and a concentration of catalyst particles in excess of that desired for said conversion when solid particles of catalyst only are circulated through said zone, dispersing particles of catalytic material into said vapors in amount dependent upon the activity of the catalyst and the rate of decrease of activity resulting from deposition of carbonaceous material, and circulating dispersed particles of a catalytically inert material through said zone in addition to the finely divided catalytic material in amount sufficient to substantially decrease the concentration of catalyst particles in said zone at a given feed rate, said particles of catalytic material having settling characteristics such that they are carried with the vapors concurrently through the conversion zone and said particles of inert material have settling characteristics such that they pass through the conversion zone countercurrently to the vapors.

2. A process as defined in claim 6 wherein said inert material is withdrawn from the lower part of the conversion zone and reintroduced at the top portion thereof and the temperature of the withdrawn material is substantially modified by heat exchange prior to reintroduction.

3. A process of catalytically converting hydrocarbons wherein hydrocarbon vapors are contacted with finely divided dispersed catalyst to effect the desired conversion and also resulting in the formation of deactivating deposits of carbonaceous material on the catalyst which comprises flowing vapors of the hydrocarbons upwardly through a conversion zone at a vapor velocity within limits of about 1 to 3 feet per second and adapted to provide the required vapor resident time in said zone, dispersing particles of catalytic material into said vapors in the upper portion of the conversion zone in amount dependent upon the activity of the catalyst and the rate of decrease of activity resulting from deposition of carbonaceous material, said catalytic particles having a settling rate sufficiently high to permit them to settle through the conversion zone in a direction countercurrent to the vapor flow, and circulating dispersed particles of a catalytically inert material through said zone in addition to the finely divided catalytic material in amount sufficient to substantially change the concentration of catalyst particles in said zone, said particles of inert material having settling characteristics such that they are carried concurrently with the vapors through the conversion zone.

4. A catalytic hydrocarbon conversion process which comprises flowing vapors of the hydrocarbons undergoing conversion upwardly through a conversion zone with a relatively low velocity of said vapors maintained within limits of about 1 to 3 feet per second, simultaneously dispersing and passing particles of finely divided catalytic material through said zone, and effecting a change in the concentration of said catalyst in the conversion zone by circulating through the zone, in addition to the finely divided catalytic material, catalytically inert solid particles, said particles of catalytic material and catalytically inert material having different settling characteristics whereby the lighter of the two components is carried overhead concurrently with the vapors and the relatively heavy component settles through and is withdrawn from the lower portion of the conversion zone.

5. A process of catalytically converting hydrocarbons which comprises introducing powdered solid catalyst into a conversion zone, flowing vapors undergoing conversion upwardly through the conversion zone at a relatively low velocity of the order of about 1 to 3 feet per second whereby a relatively high concentration of the finely divided catalyst is maintained in said zone, adjusting said concentration within the desired limits by circulating more finely divided solid inert particles through said zone, withdrawing the inert particles overhead with the vaporous reaction products, and withdrawing the catalytic particles from the lower portion of said zone.

6. A process of catalytically converting hydrocarbons wherein hydrocarbon vapors are contacted with finely divided dispersed catalyst to effect the desired conversion and also resulting in the formation of deactivating deposits of carbonaceous material on the catalyst which comprises flowing vapors of the hydrocarbons upwardly through a conversion zone at a vapor velocity within the limits of about 1 to 3 feet per second, adapted to provide the required vapor resident time in said zone, dispersing particles of catalytic material into said vapors in the upper portion of the conversion zone in amount dependent upon the activity of the catalyst and the rate of decrease of activity resulting from deposition of carbonaceous material, said catalytic particles having a settling rate sufficiently high to permit them to settle through the conversion zone in a direction counter-current to the vapor flow, and circulating dispersed particles of a catalytically inert material through said zone in addition to the finely divided catalytic material in amount sufficient to substantially change the concentration of catalyst particles in said zone, said particles of inert material having settling characteristics such that they are carried concurrently with the vapors through the conversion zone.

7. A process of catalytically converting hydrocarbons wherein hydrocarbon vapors are contacted with finely divided dispersed catalyst to effect the desired conversion which comprises flowing vapors of the hydrocarbons upwardly through a conversion zone at a vapor velocity within the limits of about 1 to 3 feet per second, adapted to provide the required vapor residence time in said zone, dispersing particles of catalytic material into said vapors in the conversion zone in amount dependent upon the activity of the catalyst and the rate of decrease of activity resulting from deposition of carbonaceous material, said catalytic particles having settling rates sufficiently high to prevent substantial entrainment of said catalytic material in the vapors passing out of said conversion zone, and circulating dispersed particles of a catalytically inert material through said zone in addition to the finely divided catalytic material in amount sufficient to substantially change the concentration of catalyst particles in said zone, said particles of inert material having settling characteristics such that they are carried concurrently with the vapors out of the conversion zone.

8. In the conversion of hydrocarbons wherein a finely divided solid catalyst is passed through a circuit comprising a reaction zone wherein said catalyst is suspended in gaseous reactants for effecting said conversion and a reactivation zone, the improvement which comprises introducing said suspended catalyst and a relatively inert mobile solid heat absorbent material composed of particles of higher settling rate than said catalyst into opposite ends of said conversion zone, withdrawing absorbent material and catalyst from ends of said conversion zone opposite their points of introduction, separating catalyst from the effluent, subjecting said catalyst to regeneration treatment and subjecting said absorbent to treatment with oxidizing gas to burn carbonaceous deposits therefrom, recovering heated absorbent material and regenerated catalyst, and recycling each to said conversion zone.

9. In the conversion of hydrocarbons wherein a finely divided solid catalyst is passed through a circuit comprising a reaction zone wherein said catalyst is suspended in gaseous reactants for effecting said conversion and a reactivation zone, the improvement which comprises introducing said suspended catalyst and a relatively inert mobile solid heat absorbent material composed of particles of higher settling rate than said catalyst into opposite ends of said conversion zone, withdrawing absorbent material and catalyst from ends of said conversion zone opposite their points of introduction, separating catalyst from the effluent, heating said withdrawn absorbent material, and recycling heated absorbent material to said conversion zone.

10. In a continuous process for effecting the catalytic conversion of hydrocarbons with finely divided catalyst which is repeatedly contacted with a gas or vapor, the improvement which comprises charging to the process an active silica-alumina catalyst in the form of a powder consisting of particles having relatively high settling rates and also charging to the process a powder of a solid having substantially no catalytic activity consisting essentially of particles having settling rates lower than that of the particles of said active catalyst, said substantially inactive powder being introduced in a substantial amount such that in a mixture so produced the particles having high settling rates consist essentially of said active catalyst and the particles of low settling rates consist predominantly of said substantially inactive powder, and passing the gas or vapor upwardly through a contact zone in said process containing a mixture of said active and inactive powders at a velocity within limits of about 1 to 3 feet per second effective to carry out of the contact zone in suspension substantially only inactive particles.

WALTER H. BORCHERDING.

REFERENCES CITED

The following references are of record in the file of this patent:

UNITED STATES PATENTS

| Number | Name | Date |
| --- | --- | --- |
| 1,984,380 | Odell | Dec. 18, 1934 |
| 2,253,486 | Belchetz | Aug. 19, 1941 |
| 2,290,845 | Voorhees | July 21, 1942 |
| 2,303,047 | Hemminger | Nov. 24, 1942 |
| 2,310,377 | Voorhees | Feb. 9, 1943 |
| 2,312,006 | Thiele | Feb. 23, 1943 |
| 2,312,230 | Belchetz | Feb. 23, 1943 |
| 2,325,136 | Kassel | July 27, 1943 |
| 2,325,611 | Keranen | Aug. 3, 1943 |
| 2,376,564 | Upham et al. | May 22, 1945 |

FOREIGN PATENTS

| Number | Country | Date |
| --- | --- | --- |
| 118,399 | Australia | Apr. 27, 1944 |